(12) United States Patent
Nojima et al.

(10) Patent No.: US 8,282,843 B2
(45) Date of Patent: Oct. 9, 2012

(54) METHOD FOR MANUFACTURING PERPENDICULAR MAGNETIC HEAD INCLUDING A MAIN POLE SURROUNDED BY SHIELD LAYERS

(75) Inventors: Tatsuhiro Nojima, Tokyo (JP); Hisayoshi Watanabe, Tokyo (JP); Masachika Hashino, Tokyo (JP)

(73) Assignee: TDK Corporation, Tokyo (JP)

( * ) Notice: Subject to any disclaimer, the term of this patent is extended or adjusted under 35 U.S.C. 154(b) by 374 days.

(21) Appl. No.: 12/591,130

(22) Filed: Nov. 10, 2009

(65) Prior Publication Data

US 2011/0108520 A1 May 12, 2011

(51) Int. Cl.
*B44C 1/22* (2006.01)

(52) U.S. Cl. .. 216/22; 216/37; 360/125.08; 360/125.24; 360/118; 29/603.14

(58) Field of Classification Search .............. 216/22, 216/37; 360/125.08, 125.24, 119, 126; 29/603.01, 29/603.14
See application file for complete search history.

(56) References Cited

U.S. PATENT DOCUMENTS

| 7,322,095 B2 | 1/2008 | Guan et al. |
| 2007/0217069 A1* | 9/2007 | Okada et al. .......... 360/126 |
| 2008/0112081 A1* | 5/2008 | Matono .......... 360/125.08 |

FOREIGN PATENT DOCUMENTS

JP A2006-073058 3/2006

* cited by examiner

*Primary Examiner* — Nadine G Norton
*Assistant Examiner* — Maki Angadi
(74) *Attorney, Agent, or Firm* — Posz Law Group, PLC

(57) ABSTRACT

A method of manufacturing a perpendicular magnetic head having a writing element that writes magnetic information to a recording medium includes forming a main magnetic pole part generating a magnetic field on a substrate; removing at least a part of the substrate and a material existing at a circumference of the main magnetic pole part to expose an entire circumference of the main magnetic pole part at a surface that becomes an opposing medium surface (ABS) opposite to the recording medium; forming a shield gap film that is made of a nonmagnetic material so as to cover the entire circumference of the main magnetic pole part at least at the surface that becomes the ABS; and forming a shield layer so as to cover an entire circumference of the shield gap film at least at the surface that becomes the ABS.

6 Claims, 15 Drawing Sheets

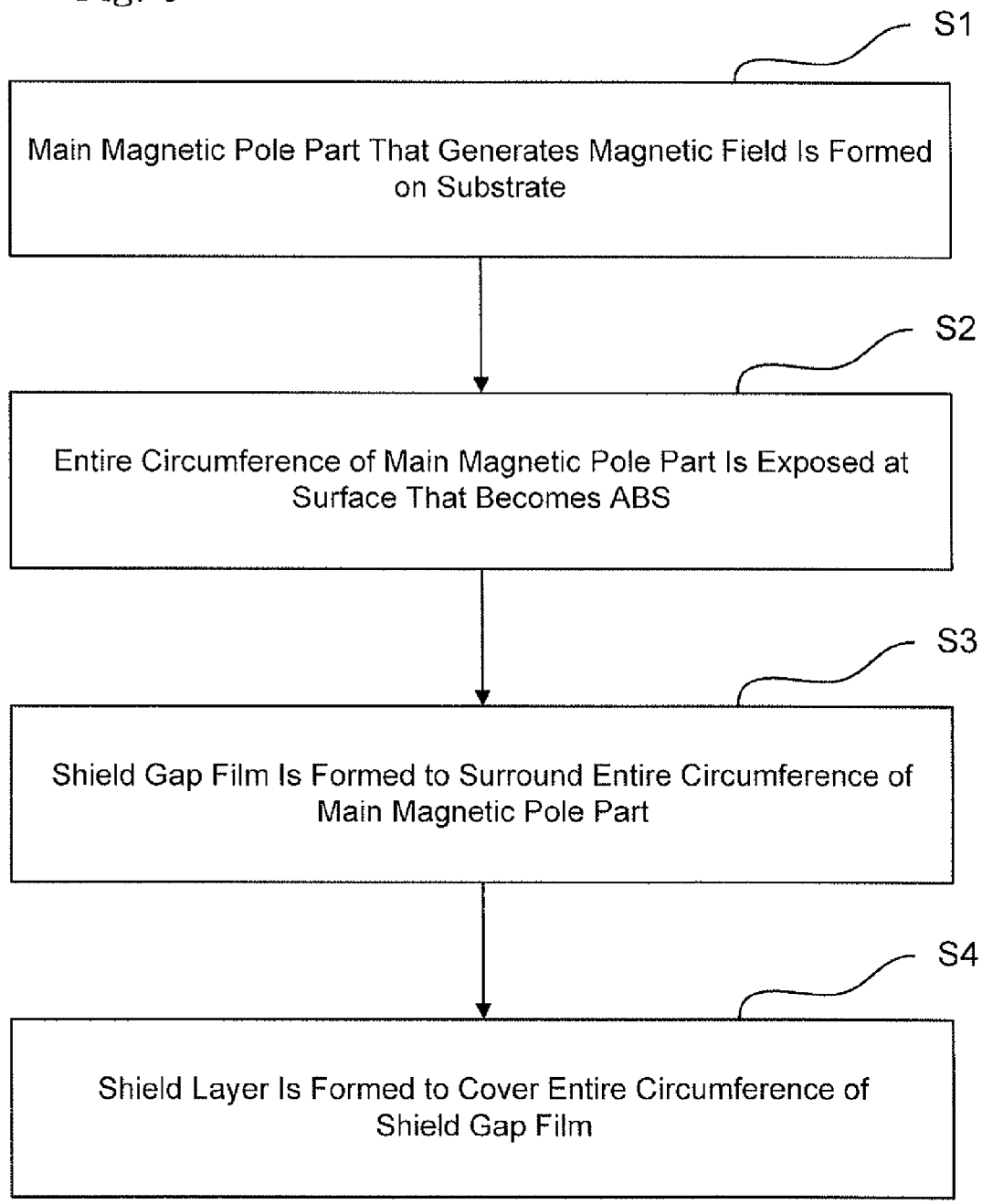

Fig. 7A
Fig. 7B
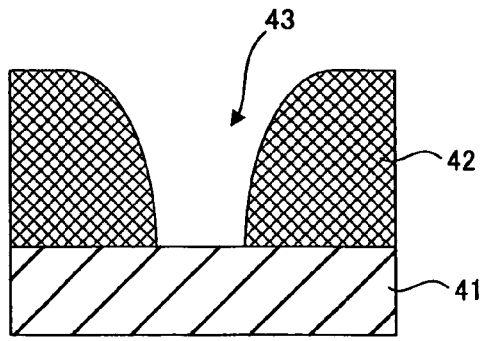
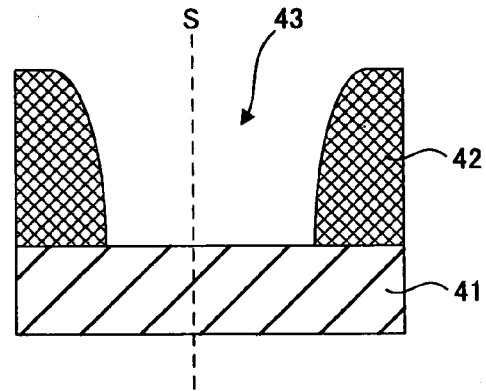
Fig. 8A
Fig. 8B
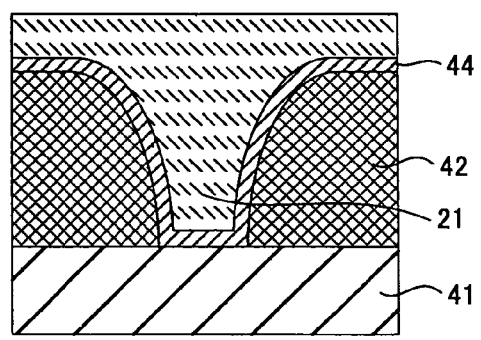
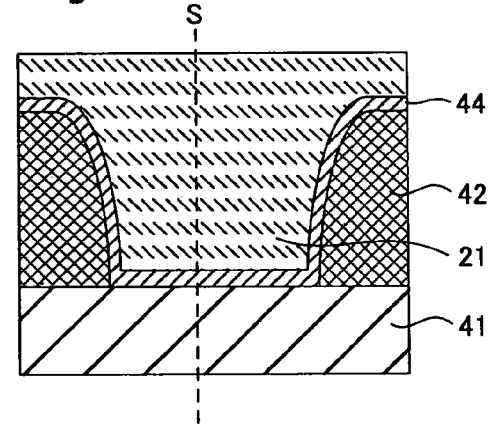
Fig. 9A
Fig. 9B
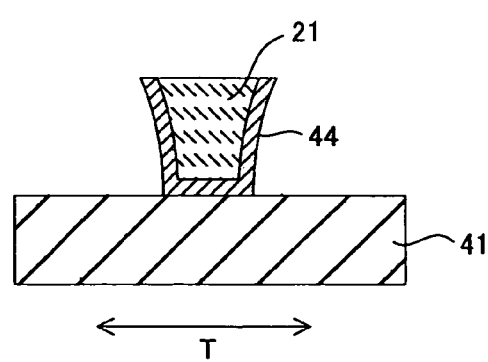
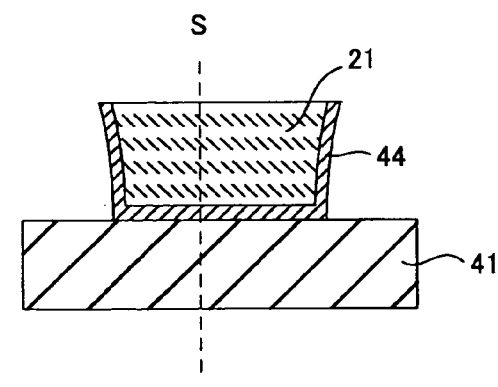

Fig. 20A
Fig. 20B
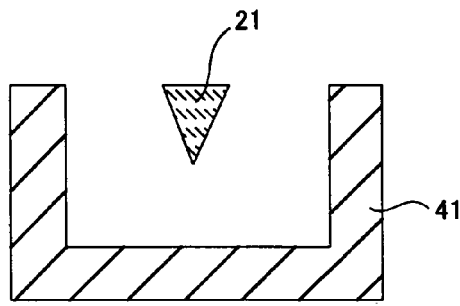
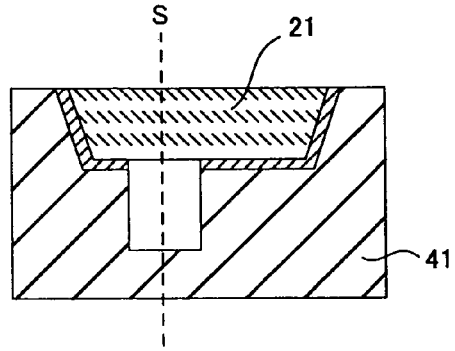
Fig. 21A
Fig. 21B
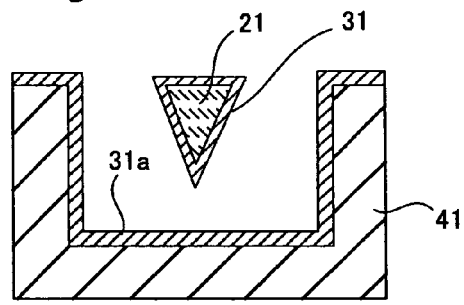
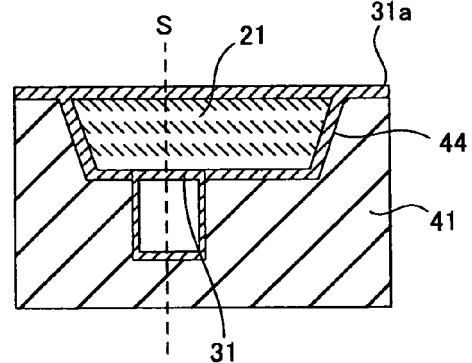
Fig. 22A
Fig. 22B
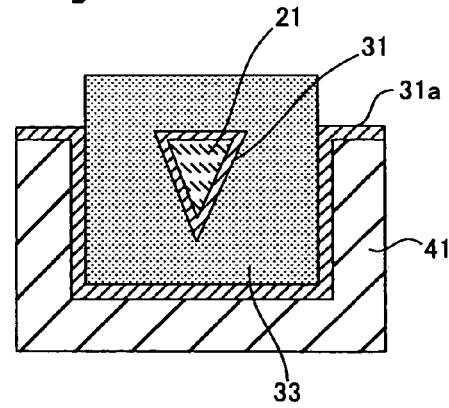
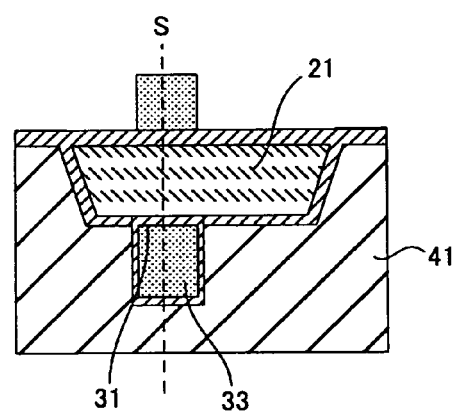

Fig.27
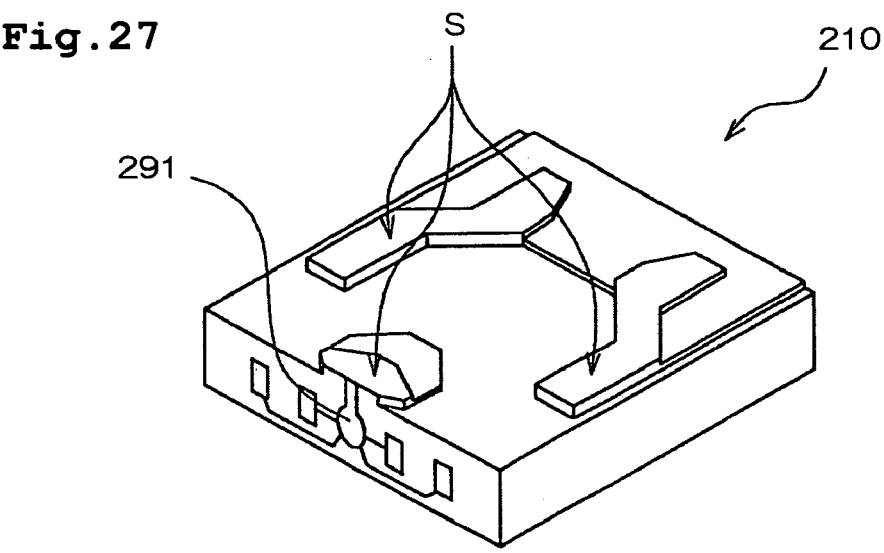
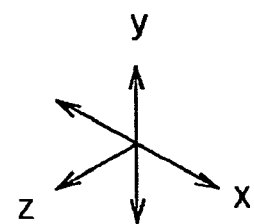
Fig.28
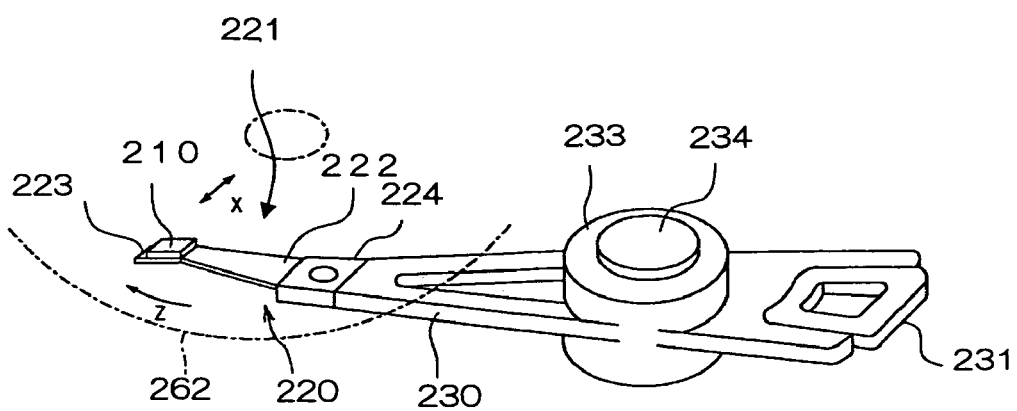

METHOD FOR MANUFACTURING PERPENDICULAR MAGNETIC HEAD INCLUDING A MAIN POLE SURROUNDED BY SHIELD LAYERS

TECHNICAL FIELD

The present invention relates to a method of manufacturing a perpendicular magnetic head that writes magnetic information to a recording medium and that includes a main magnetic pole surrounded by a shield layer.

BACKGROUND

A magnetic head (hereinafter: perpendicular magnetic head) of a perpendicular magnetic recording system has a magnetic pole that generates a magnetic field for recording magnetic information in a recording medium. In order to prevent a magnetic field for recording from expanding and to prevent magnetic information that is already recorded in a recording medium from being unintentionally erased, a perpendicular magnetic head that has a shield layer for intaking (or collecting) magnetic flux in the surrounding area of a main magnetic pole is becoming mainstream.

There are three types of parts for the shield layer: (1) two side shield layers that are located at both sides of a magnetic pole in the track width direction, (2) a leading shield layer that is located at a leading side of the magnetic pole, and (3) a trailing shield layer that is located at a trailing side of the magnetic pole.

In an opposing medium surface that faces a recording medium, the main magnetic pole part is surrounded by these three types of the shield layers. A magnetic head in a, so-called, "around-shield" type discussed above and a method for manufacturing thereof are disclosed in U.S. patent publication No. 2008/0112081 (hereinafter: "patent reference 1").

A method for manufacturing a perpendicular magnetic head disclosed in patent reference 1 is explained below with reference to FIG. 1. When a writing part of a recording head unit is formed in the method for manufacturing the perpendicular magnetic head, a leading shield layer 514 is formed as a base on an insulating layer 513. Then, a resist pattern (not shown) that has an opening part is formed on the leading shield layer 514. In order to form the resist pattern, after a resist film is formed on the leading shield layer 514, the opening part is formed by a photolithography method.

A nonmagnetic layer 515 is formed with a uniform thickness to cover at least an inner wall of the opening part in the resist film by using a dry film forming method. When the nonmagnetic layer 515 is formed, the surface (including the inside wall) of the resist pattern and the leading shield layer 514 that is exposed at the opening part are covered by the nonmagnetic layer 515.

Then, a main magnetic pole layer 540 is formed so as to fill the opening part in which the nonmagnetic layer 515 is formed. At the time of forming the main magnetic pole layer 540, a seed layer 516 and a plating layer 517 are formed as a magnetic layer for forming the main magnetic pole layer 540 so as to fill at least the opening part in which the nonmagnetic layer 515 is formed.

Subsequently, by removing the remaining resist pattern, the leading shield layer 514 is exposed on both sides of the main magnetic pole layer 540 in the track width direction (X direction in FIG. 1). Then, two side shield layers 518R and 518L are formed on both sides of the main magnetic pole layer 540 in the track width direction so as to be separated from the main magnetic pole layer 540 through the nonmagnetic layer 515, respectively.

At the final step, after a gap layer 519 as a nonmagnetic layer is formed on the nonmagnetic layer 515, the main magnetic pole layer 540, and the two side shield layers 518R and 518L by, for example, using a sputtering method, a trailing shield layer 520 is formed on the gap layer 519. As a result, a writing part of a recording head part is completed.

However, with respect to the manufacturing method for making the opening part at the resist discussed above, because the photolithography process is performed on the resist film that is directly formed on the leading shield layer 514 that is made of a metal, the resist is, for example, exposed again by light that is reflected at the leading shield layer 514 at the time of the exposure so that a phenomena, such as halation, that worsen shapes of the opening part may occur. When the halation occurs, the opening part cannot be formed in the desired shapes. As a result, there are problems such as: shapes of the main magnetic pole layer 540 cannot be controlled, and performance as a writing element is lowered.

When the shapes of the main magnetic pole layer 540 are controlled by adjusting a layer thickness of the nonmagnetic layer 515 that is formed on the inside wall of the opening part in the resist, there is a problem in that the layer thickness of the nonmagnetic layer 515 varies location by location so that functions of the shield layers 514, 518L, and 518R that are formed around of the nonmagnetic layer 515 are lowered.

As one of the measures to resolve these problems, a halation prevention nonmagnetic layer 515A that prevents the halation can be formed on the leading shield layer 514 before the resist is formed on the leading shield layer 514. In this case, after a resist pattern is formed on the halation prevention nonmagnetic layer 515A, the main magnetic pole layer 540 is formed on the halation prevention nonmagnetic layer 515A by using the same method as discussed above. The magnetic head formed through the method discussed above is shown in FIG. 3.

In the case of using the halation prevention nonmagnetic layer 515A, when the remaining resist pattern is removed after the main magnetic pole layer 540 is formed, the halation prevention nonmagnetic layer 515A formed on the leading shield layer 514 is exposed at both sides of the main magnetic pole payer 540 in the track width direction (X direction in FIG. 3) (see FIG. 2). Therefore, because the leading shield layer 514 magnetically connects to the side shield layers 518L and 518R that are formed next, it is necessary that the halation prevention nonmagnetic layer 515A that is exposed on both sides of the main magnetic pole layer 540 is removed.

However, the inventors of the present invention realized that patent reference 1 still has a problem discussed below as a result of testing and investigation. Because the main magnetic pole layer 540 and the halation prevention nonmagnetic layer 515A surrounding thereof have a tiny structure, it is hard to completely remove the halation prevention nonmagnetic layer 515A. Therefore, as shown in FIG. 3, a part 515E of the halation prevention nonmagnetic layer 515A that exists between the main magnetic pole layer 540 and the leading shield layer 514 remains. A gap between the main magnetic pole layer 540 and the shield layers 514, 518L, and 518R is not uniform. As a result, because the shield layers 514, 518L, and 518R have a sharp-pointed part, the magnetic field is concentrated at that part, so that a problem of decreasing the functions of the shield layers 514, 518L, and 518R as a shield layer occurs. As discussed above, performance as a writing element is lowered.

Therefore, it is desired to provide a method of manufacturing a perpendicular magnetic head in which performance of a writing element can be improved by keeping a gap between a shield layer and a main magnetic pole layer as uniform as possible.

SUMMARY

An object of the present invention is to provide a method of manufacturing a magnetic head in which performance of a writing element can be improved by controlling a gap between a shield layer and a main magnetic pole part to be as uniform as possible.

A method of manufacturing a perpendicular magnetic head having a writing element that writes magnetic information to a recording medium includes a first step for forming a main magnetic pole part generating a magnetic field on a substrate; a second step for removing at least a part of the substrate and a material existing at a circumference of the main magnetic pole part so as to expose an entire circumference of the main magnetic pole part at a surface that becomes an opposing medium surface (ABS) opposite to the recording medium; a third step for forming a shield gap film that is made of a nonmagnetic material so as to cover the entire circumference of the main magnetic pole part at least at the surface that becomes the ABS; and a fourth step for forming a shield layer so as to cover an entire circumference of the shield gap film at least at the surface that becomes the ABS.

In the present invention, because a shield gap film is formed in the circumference of a main magnetic pole part in an opposing medium surface after the main magnetic pole part is formed, a layer thickness of the shield gap film is generally uniform. The function of the shield layer as a shield is improved because the gap between the main magnetic pole layer and the shield layer is substantially uniform. As a result, performance of a writing element can be improved. The gap between the main magnetic pole part and the shield layer is easily controlled by a forming film amount of the shield gap film.

The above-mentioned object, as well as other objects, characteristics, and advantages of the present invention will be described below in more detail with reference to attached drawings illustrating an embodiment of the present invention.

BRIEF DESCRIPTION OF THE DRAWINGS

FIG. 6 is a flow diagram of a method for forming a writing element according to one embodiment of the present invention.

FIGS. 7A-16A and 7B-16B are schematic views of steps explaining a method of forming a writing element according to a first embodiment.

FIGS. 17A-23A and 17B-23B are schematic views of steps explaining a method of forming a writing element according to a second embodiment.

FIG. 27 is a perspective view of a slider according to the present invention.

FIG. 28 is a perspective view of a head arm assembly including a head gimbal assembly assembled with a slider according to the present invention.

DETAILED DESCRIPTION OF THE INVENTION

Hereafter, a perpendicular magnetic head according to one embodiment will be explained with reference to the drawings.

Figure 4:
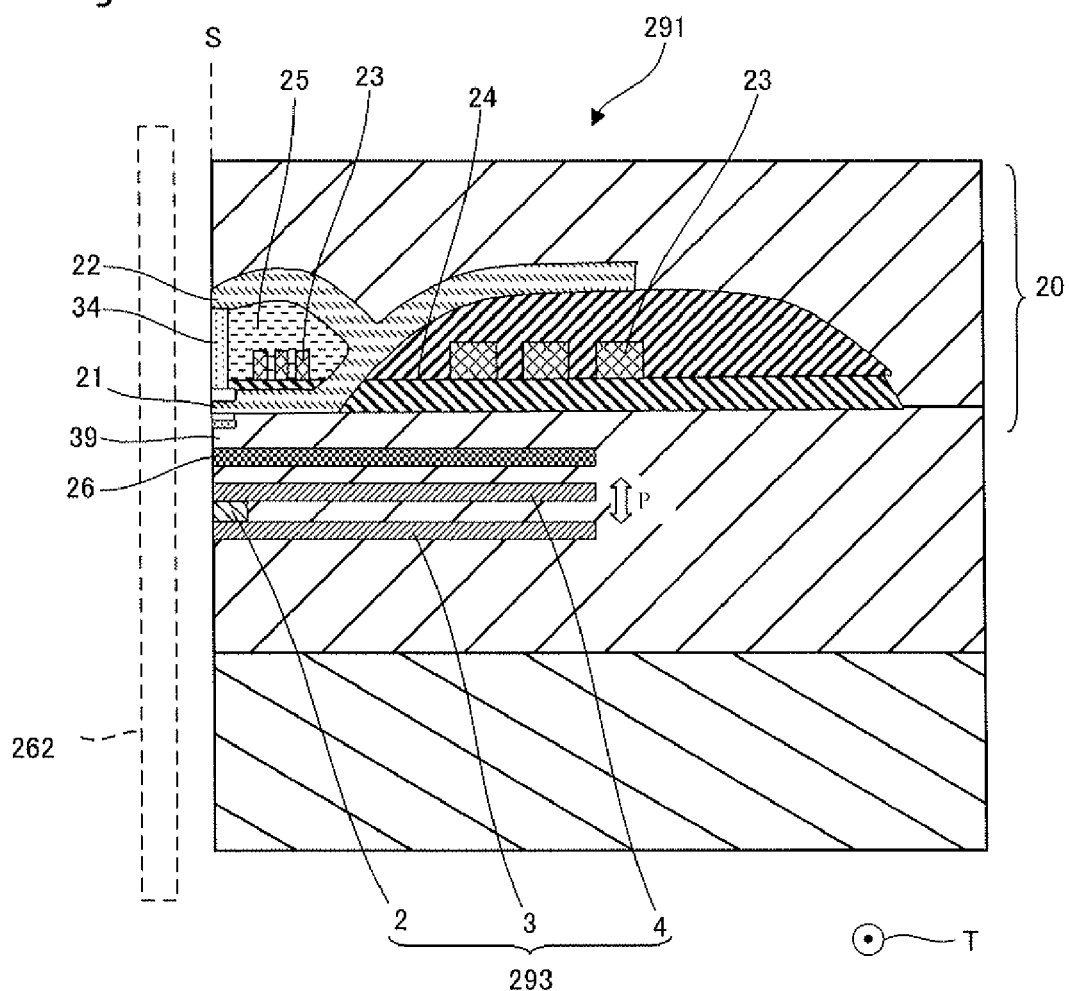
FIG. 4 is a sectional view of a magnetic head in a surface orthogonal to an opposing medium surface.
Figure 5:
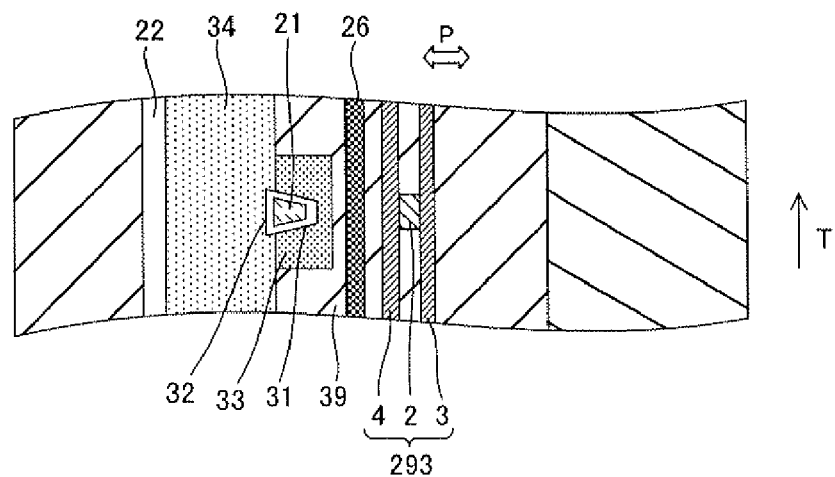
FIG. 5 is a plan view of a magnetic head in FIG. 3 seen from an opposing medium surface.

FIG. 4 is a sectional view of a magnetic head in a surface orthogonal to an opposing medium surface. FIG. 5 is a plan view of a magnetic head 291 seen from an opposing medium surface (air bearing surface: ABS). The ABS S is a surface of the magnetic head 291 opposite to a recording medium 262 when a signal from the recording medium 262 is read.

The magnetic head 291 has a writing element 20 that writes magnetic information to the recording medium 262 and a reading element 293 that reads the magnetic information written in the recording medium 262.

The reading element 293 has a magnetoresistive effect element (MR element) 2, and upper and lower shield layers 3 and 4 that are provided to sandwich the MR element 2 to a film surface orthogonal direction P of the MR element 2. The MR element 2 is an element that shows a magnetoresistive effect and can be in any types of film configuration. For example, the MR element 2 can be a spin-valve type element.

The writing element 20 is provided above the upper shield layer 4 through an interelement shield layer 26 that is formed by a sputtering method or the like. The writing element 20 has a configuration for so called perpendicular magnetic recording. A magnetic pole that generates the magnetic field is configured with a main magnetic pole part 21 and an auxiliary magnetic pole part 22. These magnetic pole parts 21 and 22 are formed by, for example, a frame plating method. The main magnetic pole part 21 is made of a ferromagnetic material, such as FeCo, is exposed at the ABS S and extends in the approximate orthogonal direction to the ABS S.

A coil layer 23 that is located on a gap layer 24 made of an insulating material circles the circumference of the main magnetic pole part 21 in a location away from the ABS S. Magnetic flux is induced at the main magnetic pole part 21 by the coil layer 23. The coil layer 23 is formed by, for example, a frame plating method. The magnetic flux is led into the inside of the main magnetic pole part 21 and extends toward the recording medium 262 from the ABS S. It is preferred that the main magnetic pole part 21 is narrowed not only in the film surface orthogonal direction P but also in the track width direction (directional arrow T in FIG. 5) in the vicinity of the ABS S so as to generate a fine and strong writing magnetic field corresponding to the high recording density.

The auxiliary magnetic pole part 22 is a magnetic layer that is magnetically coupled to the main magnetic pole part 21. The auxiliary magnetic pole part 22 is made of an alloy and so on. The alloy is, for example, made of two or three substances selected from Ni, Fe, and Co. It is preferred that the auxiliary magnetic pole part 22 is a magnetic layer with a layer thickness of about 0.01 μm-0.5 μm. The auxiliary magnetic pole part 22 extends by branching from the main magnetic pole part 21 and is separated from the main magnetic pole part 21 through a coil insulating layer 25, a trailing shield layer 34 and so on in the ABS S side. The auxiliary magnetic pole part 22 and the trailing shield layer 34, through reflux, returns the magnetic flux emitted from the main magnetic pole part 21 via the recording medium.

Because the trailing shield layer 34 is provided, a magnetic field gradient is steeper between the auxiliary magnetic pole part 22 and the main magnetic pole part 21 in the vicinity of the ABS S. As a result, the signal output jitter is small so that an error rate of reading is small.

A shield layer 33 is formed on the leading side and both sides of the main magnetic pole part 21 in the track width direction T through a shield gap film 31. The shield layer 33 is made of a magnetic material, for example, permalloy, an iron system (or iron-based) alloy, or the like. The shield layer 33 receives the component of the magnetic flux that is diffused from the main magnetic pole part 21 and prevents the magnetic flux that is emitted toward the recording medium from diffusing.

The shield gap film 31 magnetically separates the main magnetic pole part 21 from the shield layer 33 and is made of a nonmagnetic material, such as alumina and ruthenium (Ru). The shield gap film 31 covers the main magnetic pole part 21 with a generally uniform thickness.

The trailing shield layer 34 is located in the trailing side of the main magnetic pole part 21 through a shield gap film 32. The trailing shield layer 34 is configured with, for example, the same magnetic material of the shield layer 33 discussed above. The trailing shield layer 34 has functions to increase the magnetic field gradient for recording and to narrow the recording width by catching the magnetic flux diffused from the main magnetic pole part.

A method of manufacturing the magnetic head discussed above is explained below. The magnetic head 291 is completed by forming the writing element 20 above the reading element 293 through the interelement shield layer 26. Each layer and each film are formed by using film forming technologies, such as a plating method and a sputtering method, patterning technology, such as a photolithography method, etching technology, and removing technology, such as a chemical mechanical polishing (CMP) method.

In the present embodiment, after the reading element 293 and the writing element are formed on a wafer from which several chips are manufactured, a magnetic head is formed by cutting and polishing at a surface that will become the ABS later. However, the present invention is not limited to this method. The magnetic head may be formed while the ABS is being exposed if possible. In this case, the surface that becomes the ABS is polished so that the ABS is planarized.

First, the lower shield layer 3 is formed on an insulating layer to form the reading element 293. Next, the MR element 2 is formed on the lower shield layer 3. Then, the upper shield layer 4 is formed on the MR element 2.

After that, the interelement shield layer 26 is formed on the upper shield layer 4 by the sputtering method or the like. A substrate 41 is configured as a stack that is made with the reading element 293, the interelement shield layer 26, and the insulating layer 39. Then, the writing element 20 is formed on the substrate 41.

Next, a method of forming a writing element according to a first embodiment is explained with reference to a flow diagram in FIG. 6 and FIGS. 7A-16B. FIGS. 7A, 8A, . . . , and 16A are sectional views of a stack (for example, a wafer) along a cross-section that becomes an ABS. FIGS. 7B, 8B, . . . , and 16B are sectional views of a stack when the stack is cut in the orthogonal direction to a surface that becomes a recording medium.

At S1 as the first step, a main magnetic pole part that generates the magnetic field is formed on the substrate 41. Specifically, the resist 42 is formed on the surface of the substrate 41. An opening part 43 with a certain pattern is formed in the resist 42 by, for example, photolithography process (see FIGS. 7A and 7B).

A ferromagnetic material portion that becomes the main magnetic pole part 21 is formed inside the opening part 43 of the resist 42. Specifically, it is preferred that after a nonmagnetic film 44 is formed on the resist 42 and on the exposed substrate 41 inside the opening part 43, the main magnetic pole part 21 is formed on the nonmagnetic film 44 (see FIGS. 8A and 8B). The nonmagnetic film 44 is used to control the shape size of the opening part 43 and to adjust the shape of the main magnetic pole part 21. The nonmagnetic film 44 can be made of the same material of the material that exists on the surface of the substrate 41 such as, for example, alumina.

The main magnetic pole part 21 is formed by, for example, a plating process. Then, at least the surface of the main magnetic pole part 21 is planarized, and the resist 42 is removed (see FIGS. 9A and 9B). The resist is dissolved by an organic solvent, such as acetone for removing the resist. After the resist 42 is removed, the surface of the substrate 41 is exposed at both sides of the main magnetic pole part 21 in the track width direction T.

Figure 10A:
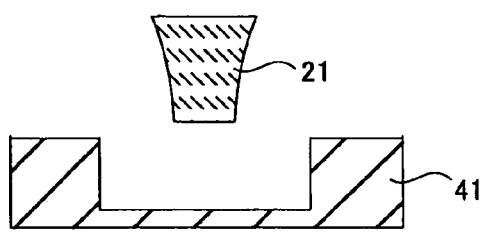
Figure 10B:
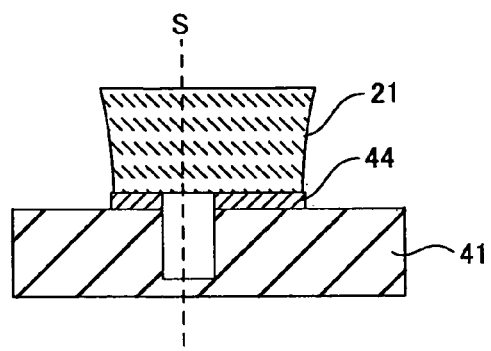

Next, at S2 as the second step, at least a part of the substrate 41 and the nonmagnetic film 44 that is a material existing at the circumference of the main magnetic pole part 21 are removed to expose of the entire circumference of the main magnetic pole part 21 at the surface that becomes the ABS S (see FIGS. 10A and 10B).

Figure 11A:
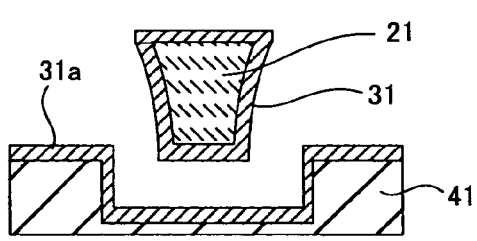
Figure 11B:
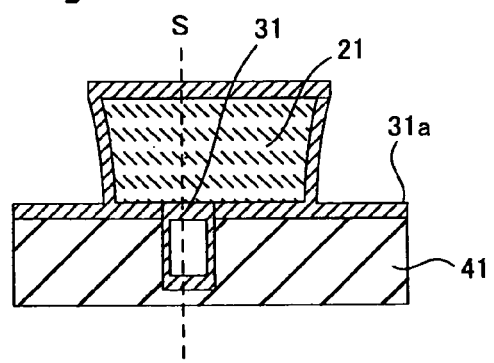
Figure 12A:
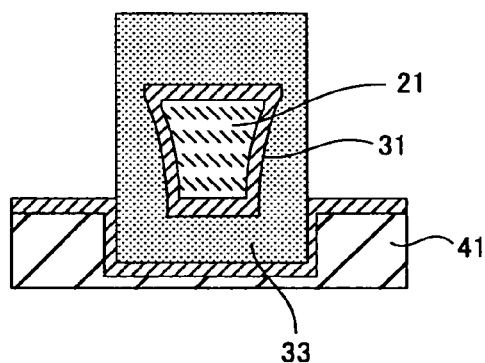
Figure 12B:
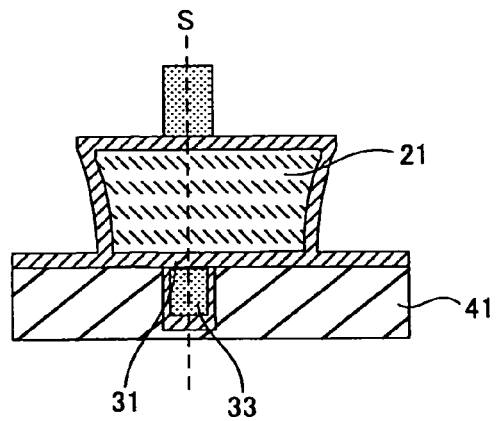
Figure 13A:
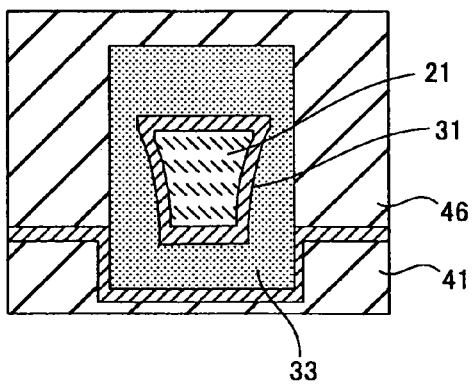
Figure 13B:
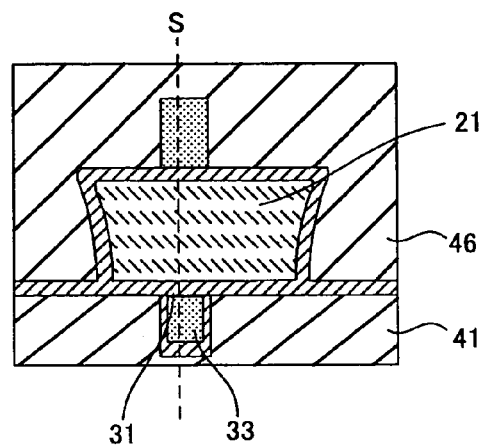

At S3, the shield gap film 31 that is made of a nonmagnetic material is formed to cover the entire circumference of the main magnetic pole part 21 at the surface that becomes the ABS S (see FIGS. 11A and 11B). The shield gap film 31 may be the same material as the nonmagnetic film 44 and the substrate 41 discussed above. In this case, when a material 31a that configures the shield gap film 31 adheres to the substrate 41, the material 31a is unified with the substrate 41. When the material 31a adheres to the nonmagnetic film 44, the material 31a is unified with the nonmagnetic film 44.

The shield gap film 31 is made of a nonmagnetic material, for example, alumina. Because the shield gap film 31 is formed at one time (or a single process) at the circumference of the main magnetic pole part 21, a layer thickness of the shield gap film 31 is generally uniform at the circumference of the main magnetic pole part 21.

Next, at S4, the shield layer 33 is formed to cover the entire circumference of the shield gap film 31 at least at the surface that becomes the ABS S (see 12A and 12B).

The shield layer 33 is also formed at the space between the shield gap film 31 and the substrate 41. Therefore, the shield layer 33 is formed to be apart from the main magnetic pole part 21 at a substantially uniform distance. The shield layer 33 is formed at least at a lower side of the main magnetic pole part 21 and both sides of the main magnetic pole part 21 in the track width direction T.

According to the method discussed above, the distance between the main magnetic pole part 21 and the shield layer 33 can be easily controlled by the film formation amount of the shield gap film 31. Because a polishing step for the shield gap film 31 is not required, the method discussed above is easily performed even in a case in which the main magnetic pole part 21 is further miniaturized.

Then, the trailing shield layer 34 and the auxiliary magnetic pole part 22 are formed according to the configuration of the magnetic head. As one example for a method of forming the trailing shield layer 34 and the auxiliary magnetic pole part 22, the entire stack is covered with an insulating layer, and then the surface of them are polished by a CMP method or the like and to be planarized (see FIGS. 14A and 14B). As a result, the surface of the main magnetic pole part 21 is planarized.

Next, the shield gap film 32 is formed on the main magnetic pole part 21. At this time, the state of exposing the main magnetic pole part 21 is maintained at a location away from the ABS S (see FIGS. 15A and 15B). Then, a yoke part 49 is formed to connect the trailing shield layer, the main magnetic pole part 21 and the auxiliary magnetic pole part 22.

After that, the auxiliary magnetic pole part or the like is formed depending on the configuration of the magnetic head. The stack that is formed by the method discussed above is cut and/or polished so that the ABS S is exposed. As a result, the magnetic head discussed above is completed.

Figure 17A:
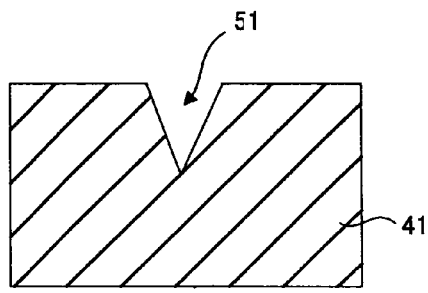
Figure 17B:
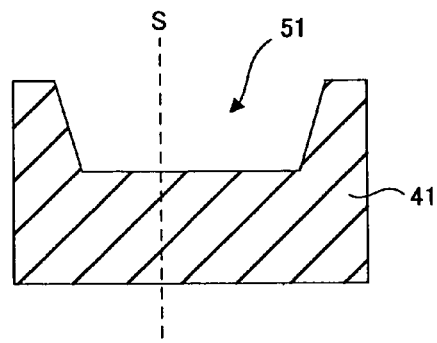
Figure 18A:
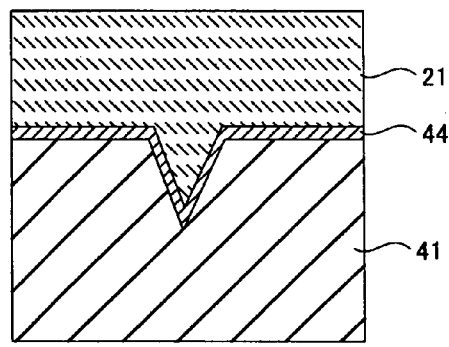
Figure 18B:
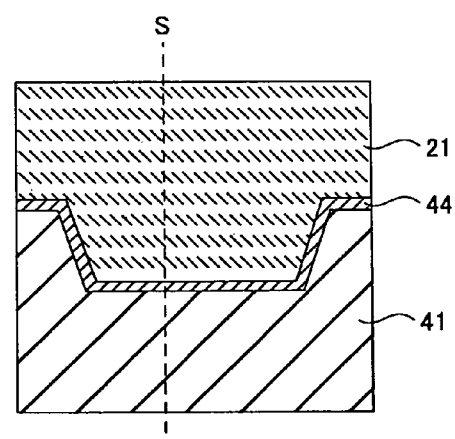

Next, a method of manufacturing a writing element according to a second embodiment is explained with reference to a flow diagram in FIG. 6 and FIGS. 17A-23B. FIGS. 17A, 18A, . . . , and 23A are sectional views of a stack along a surface that becomes an ABS. FIGS. 17B, 18B, . . . , and 23B are sectional views of a stack when the stack is cut in the orthogonal direction to a surface that becomes an ABS.

As a first step, S1, a main magnetic pole part 21 that generates the magnetic field is formed on a substrate 41. Specifically, an opening part 51 of a certain pattern is formed at the substrate 41 (see FIGS. 17A and 17B). Then, the main magnetic pole part 21 that is made of a ferromagnetic material is formed inside of the opening part 51 of the substrate 41. Specifically, it is preferred that after a nonmagnetic film 44 is formed on the surface of the substrate 41, the main magnetic pole part 21 is formed inside of the opening part 51 (see FIGS. 18A and 18B). The nonmagnetic film 44 is used to control the size of the opening part 51 and to adjust the shape of the main magnetic pole part 21. The main magnetic pole part 21 is formed by, for example, a plating process.

Figure 19A:
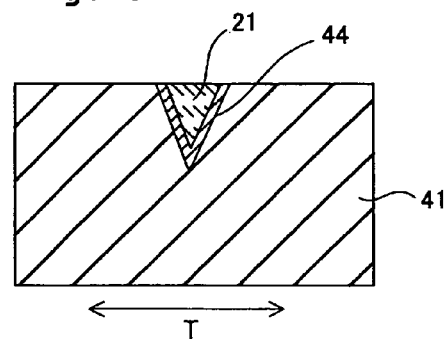
Figure 19B:
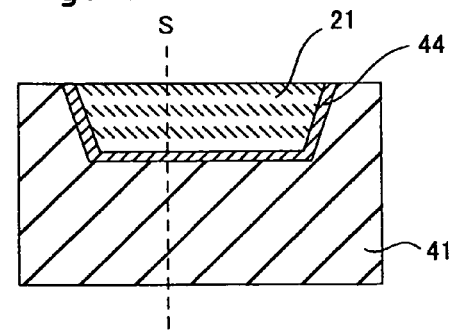

Then, at least the surface of the main magnetic pole part 21 is planarized so that the substrate 41 is exposed at both sides of the main magnetic pole part 21 in the track width direction T (see FIGS. 19A and 19B).

Next, at S2 as the second step, at least a part of the substrate 41 and the nonmagnetic film 44 that is a material existing at the circumference of the main magnetic pole part 21 are removed to expose the entire circumference of the main magnetic pole part 21 at the surface that becomes the ABS S (see FIGS. 20A and 20B).

At S3, the shield gap film 31 that is made of a nonmagnetic material is formed to cover the entire circumference of the main magnetic pole part 21 at the surface that becomes the ABS S (see FIGS. 21A and 21B). Because the shield gap film 31 is formed at one time at the circumference of the main magnetic pole part 21, a layer thickness of the shield gap film 31 is generally uniform at the circumference of the main magnetic pole part 21.

The shield gap film 31 may be made of the same material as the nonmagnetic film 44 or the substrate 41 discussed above. In such a case, when a material 31a that configures the shield gap film 31 adheres to the substrate 41, the material 31a is unified with the substrate 41. When the material 31a adheres to the nonmagnetic film 44, the material 31a is unified with the nonmagnetic film 44.

Next, at S4, the shield layer 33 is formed to cover the entire circumference of the shield gap film 31 at least at the surface that becomes the ABS S (see 22A and 22B).

The shield layer 33 is also formed at the space between the shield gap film 31 and the substrate 41. Therefore, the shield layer 33 is formed to be apart from the main magnetic pole part 21 at a substantially uniform distance. The shield layer 33 is formed at least at a lower side of the main magnetic pole part 21 and at both sides of the main magnetic pole part 21 in the track width direction.

According to the method discussed above, the distance between the main magnetic pole part 21 and the shield layer 33 can be easily controlled by the film formation amount of the shield gap film 31. Additionally, because a polishing step for the shield gap film 31 is not required, the method discussed above is easily performed even in a case in which the main magnetic pole part 21 is further miniaturized.

Figure 14A:
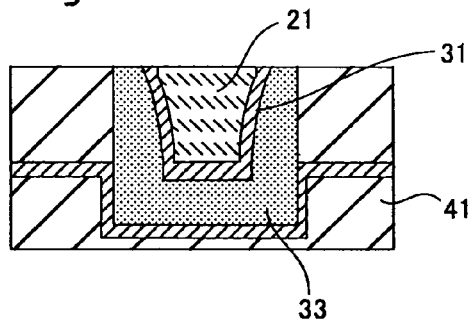
Figure 14B:
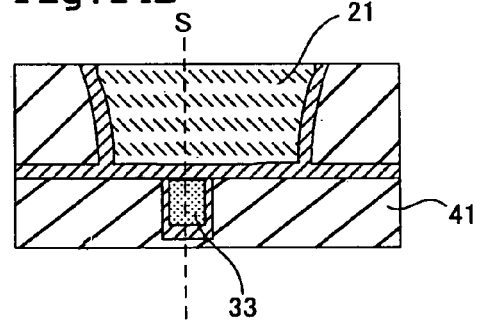
Figure 15A:
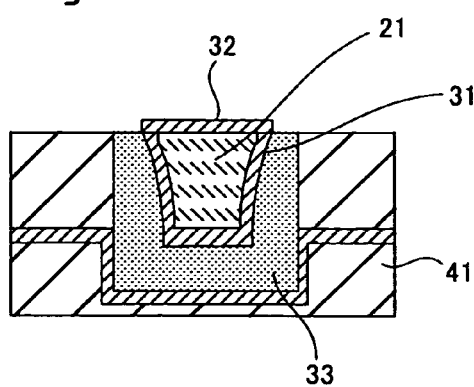
Figure 15B:
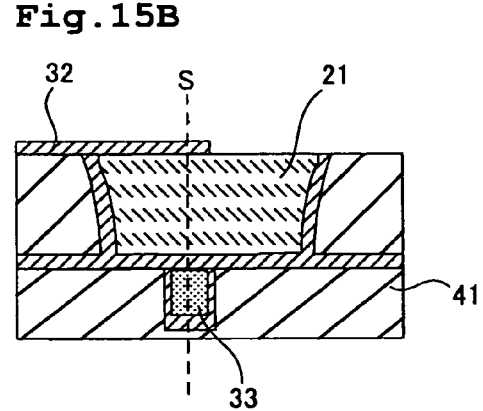
Figure 16A:
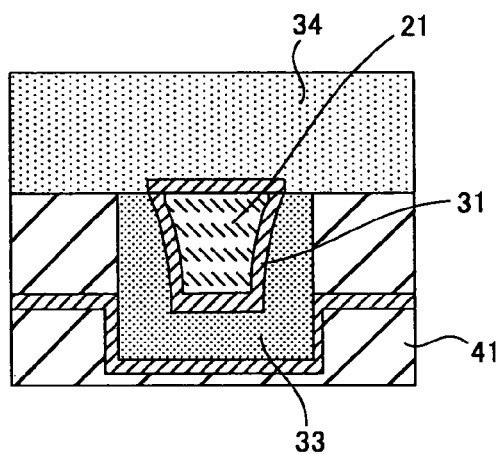
Figure 16B:
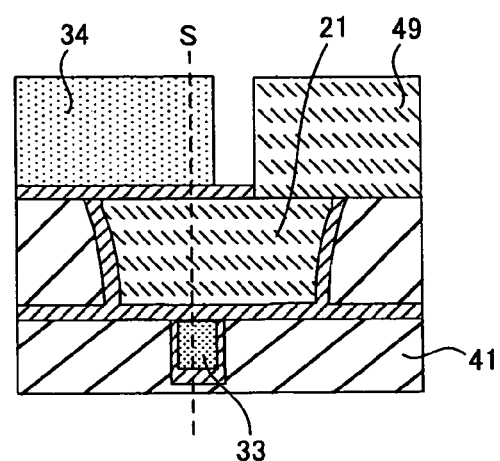
Figure 23A:
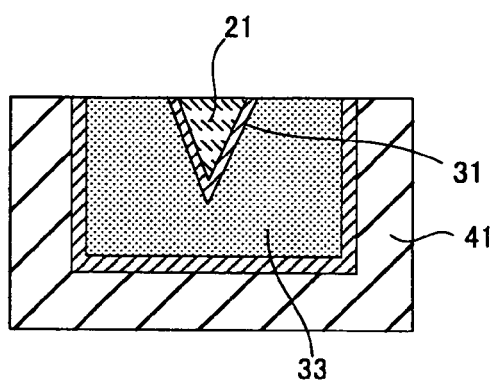
Figure 23B:
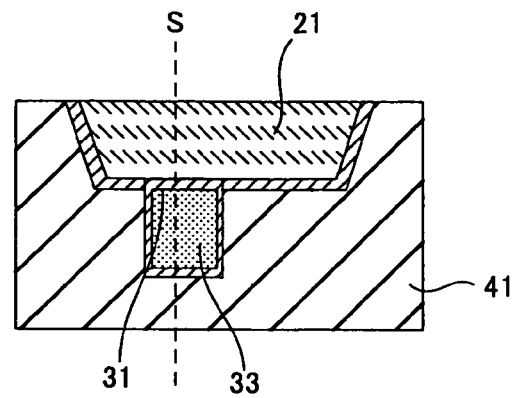

Subsequently, the whole body is polished by a CMP method or the like so that the surface is planarized as shown in FIGS. 23A and 23B. As a result, a stack that has the same structure as the stack shown in FIGS. 14A and 14B is formed. Remaining steps can be performed under the same method of forming the writing element as in the first embodiment.

The present invention is not limited to the writing element that has the structure discussed above. The present invention can be generally applied to a writing element that has the main magnetic pole part 21 generating the magnetic field for writing and the shield layer 33 surrounding the circumference of the main magnetic pole part 21 through the shield gap film 31.

The substrate 41 as an under layer for forming a writing element in the first step varies depending on the configurations of a writing element and a magnetic head. Steps after the fourth step can be changed depending on the configurations of a writing element and a magnetic head.

In the embodiments discussed above, the method of manufacturing the magnetic head that has the writing element and the reading element is explained in detail as an example. The present invention can be applied to a magnetic head that has only a writing element.

Figure 1:
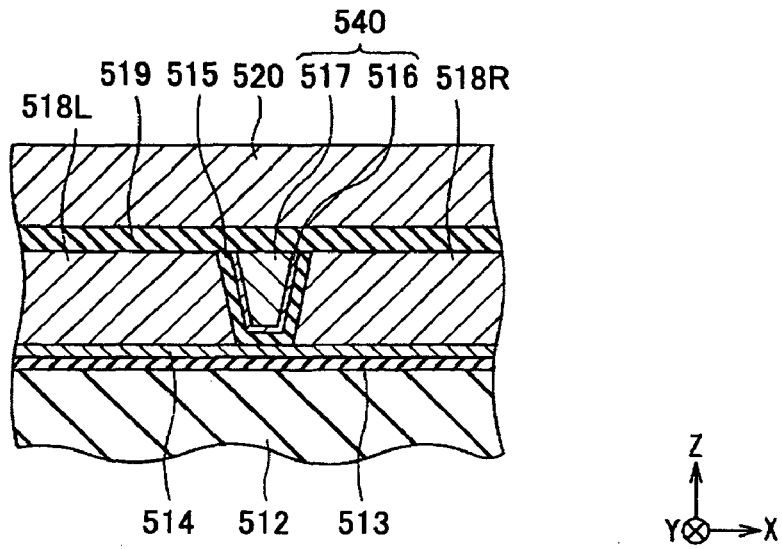
FIG. 1 is a plan view seen from an opposing medium surface of a writing element in a magnetic head according to the prior art.
Figure 2:
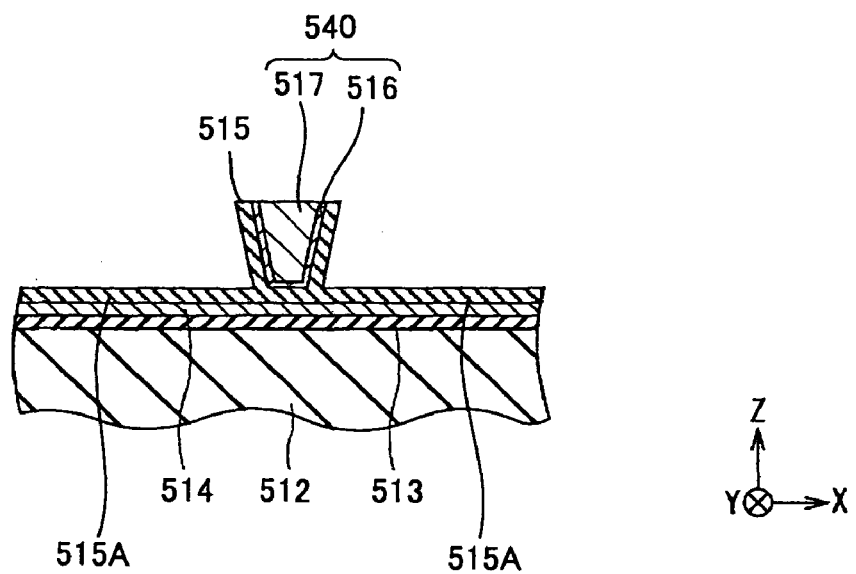
FIG. 2 is a sectional view after a manufacturing step of a writing element in a magnetic head according to the related art.
Figure 3:
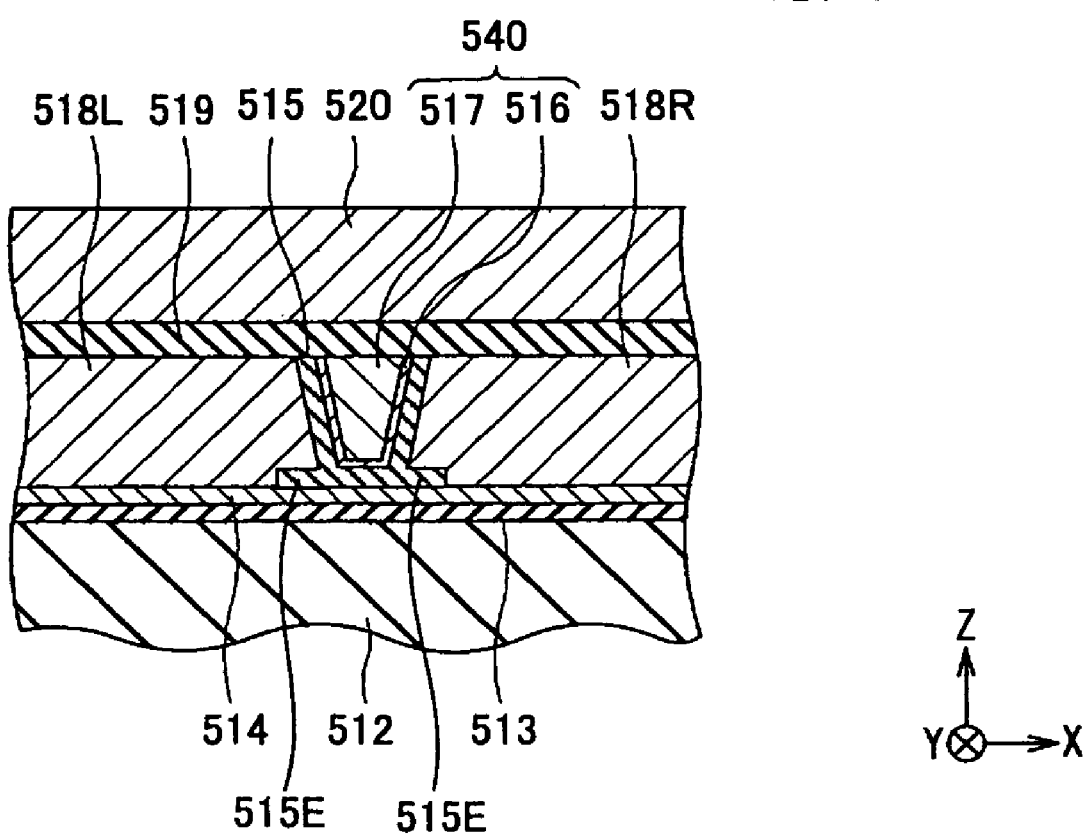
FIG. 3 is a plan view seen from an opposing medium surface of a writing element in a magnetic head according to the related art.

Next, a comparison result is explained, that compares a magnetic head that is manufactured by the method of the related technology shown in FIG. 3 and the magnetic head that is manufactured by the method according to the present invention.

Figure 24:
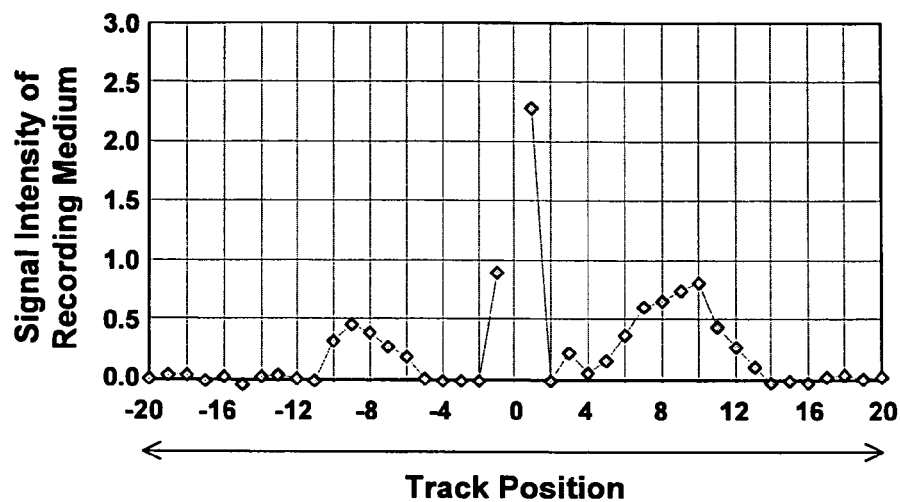
FIG. 24 is a graph showing signal intensity of a recording medium written by a writing element in FIG. 3.
Figure 25:
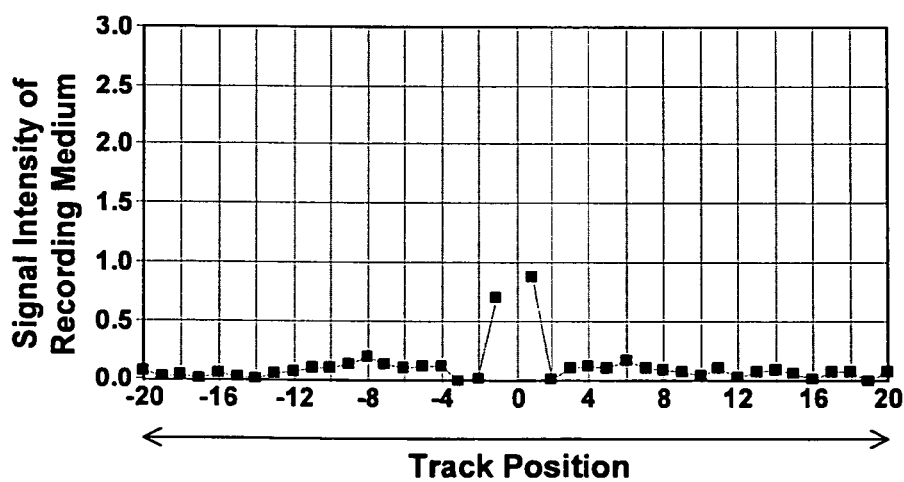
FIG. 25 is a graph showing signal intensity of a recording medium written by a writing element formed by the present invention.

FIG. 24 is a graph showing signal intensity for each track of a recording medium when a writing magnetic field is outputted to a certain track of the recording medium by using a conventional writing element shown in FIG. 3. FIG. 25 is a graph showing signal intensity for each track of a recording medium when a writing magnetic field is outputted to a certain track of the recording medium by using the writing element manufactured through the method of manufacturing according to the present invention.

In these graphs, the vertical axes show output values (Signal Intensity of Recording Medium). The horizontal axes show a track position. The "0" values in the horizontal axes represent the track positions.

Referring to the graphs, with the magnetic head shown in FIG. 3, strong signal intensities were observed not only at the track to be written but also at locations away from the track to be written (track position 0) as far as about 8-10 tracks. Therefore, magnetic information recorded in the recording medium may be unintentionally erased.

On the other hand, with the writing element formed by the method according to the present invention, signal intensities were clearly lowered at tracks away from the track to be written. Therefore, unintentional erasure of magnetic information recorded in the recording medium is less likely to happen.

Figure 26:
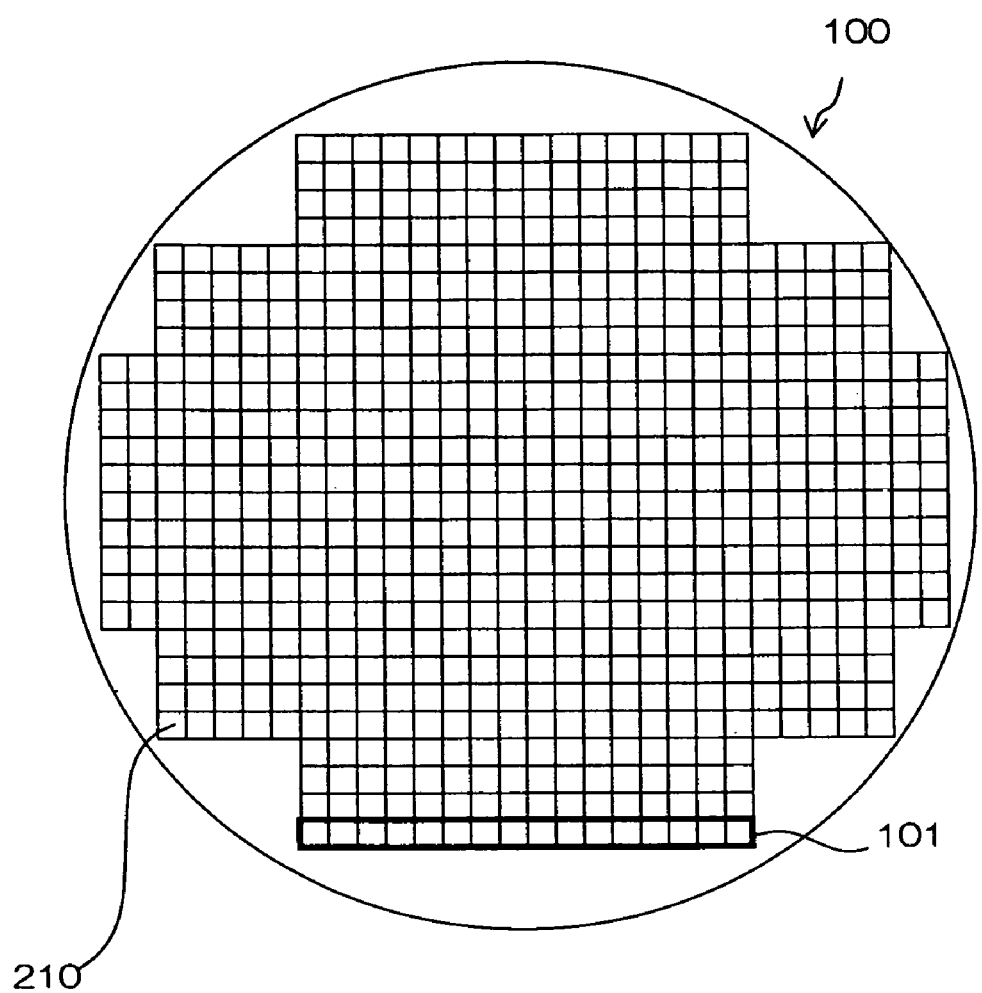
FIG. 26 is a top plan view of a wafer with respect to manufacture of a magnetoresistive effect element according to the present invention.

Next, a wafer used for manufacturing the above mentioned magnetic head 291 is described below. As shown in FIG. 26, at least an MR element configuring the above mentioned magnetic head is formed on a wafer 100. The wafer 100 is divided into a plurality of bars 101, which are work units for polishing the ABS. After polishing, the bar 101 is cut, and is divided into sliders 210 each containing a magnetic head. The wafer 100 is disposed with cutting margins (not shown) used for cutting the wafer 100 into the bars 101 and the bars 101 into the sliders 210.

Referring to FIG. 27, the slider 210 is substantially hexahedron-shaped. One face thereof is the ABS S that faces a recording medium such as a hard disk.

Referring to FIG. 28, a head gimbal assembly 220 includes the slider 210 and a suspension 221 for elastically supporting the slider 210. The suspension 221 includes a spring-set load beam 222 made of, for example, stainless steel, a flexure 223 disposed on one edge of the load beam 222 and a base plate 224 disposed on the other edge of the load beams 222. The flexure 223 is disposed to contact with the slider 210, giving a proper degree of freedom to the slider 210. On the section in which the slider 210 is mounted on the flexure 223, a gimbal part is provided for constantly keeping the position of the slider 210.

The slider 210 is placed inside the hard disk device 290, facing a hard disk 262, which is a disk-shaped recording medium to be rotated. At a time when a hard disk is rotated in the Z direction in FIG. 28, airflow passing through the space between the hard disk 262 and the slider 210 occurs lift force for the slider 210 downward in the Y direction. The slider 210 is moved away from the surface of the hard disk by the lift force. The magnetic head 291 is formed in the area near the edge portion on the air exit side (i.e., the edge portion on the lower left side in FIG. 27) of the slider 210.

The portion in which the head gimbal assembly 220 is mounted on an arm 230 is referred to as a head arm assembly. The arm 230 allows moving the slider 210 in the track width direction X of the hard disk 262. One edge of the arm 230 is mounted on the base plate 224. On the other edge of the arm 230, a coil 231 is mounted, which constitutes part of the voice coil motor. A bearing part 233 is disposed in the middle section of the arm 230. The arm 230 is rotatably supported by a shaft 234 mounted on the bearing part 233. The arm 230 and the voice coil motor for driving the arm 230 constitute an actuator.

Figure 29:
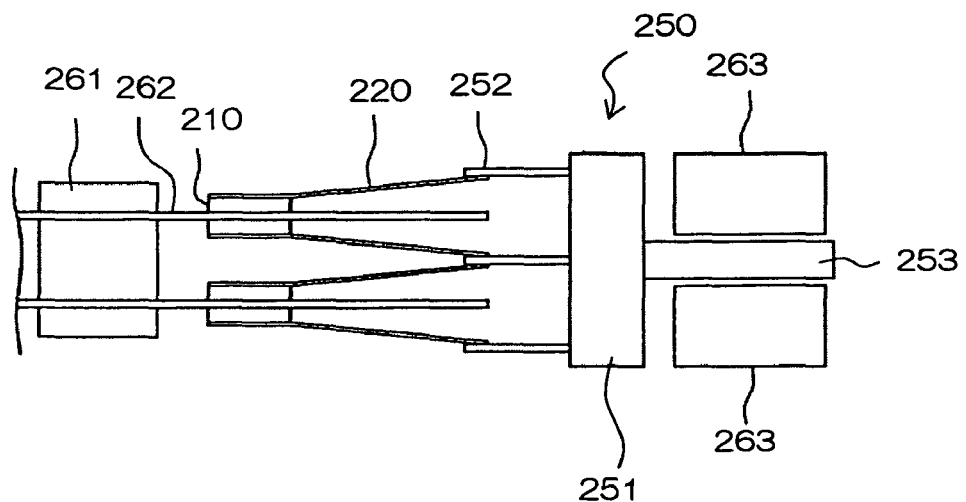
FIG. 29 is a side view of a head arm assembly assembled with a slider according to the present invention.

Next, descriptions of a head stack assembly into which the above-mentioned slider 210 is integrated and of the hard disk device 290 are given below with reference to FIGS. 29 and 30. The head stack assembly includes a carriage 251 having a plurality of arms 252, wherein a head gimbal assembly 220 is mounted on each arm. FIG. 29 is a side view of the head stack assembly. The head stack assembly 250 includes a carriage 251 having a plurality of arms 252. On each arm 252, head gimbal assemblies 220 are mounted at an interval in the vertical direction. On the side of the carriage 251 opposite to the arm 252, a coil 253 is mounted, which constitutes part of a voice coil motor. The voice coil motor has permanent magnets 263 disposed facing each other on both sides of the coil 253.

Figure 30:
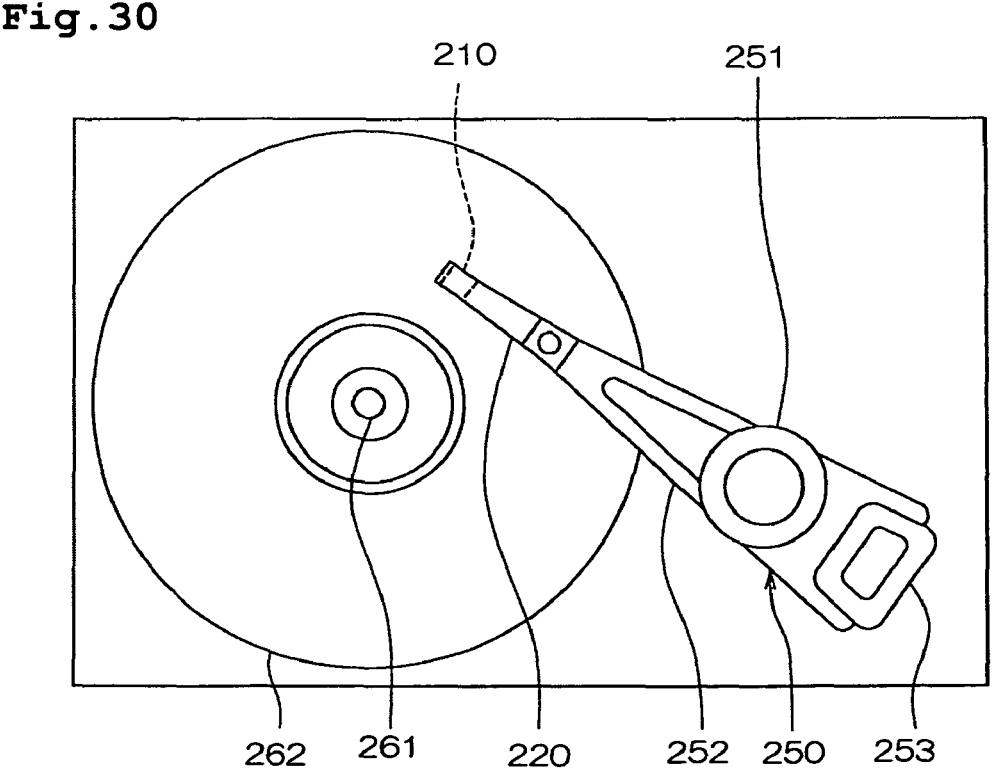
FIG. 30 is a top plan view of a hard disk device assembled with a slider according to the present invention.

As shown in FIG. 30, the head stack assembly 250 is integrated into the hard disk device 290. The hard disk device 290 has multiple hard disks 262 mounted on a spindle motor 261. For each hard disk 262, two sliders 210 are disposed facing each other on both sides of the hard disk 262. The head stack assembly 250, excluding the slider 210, and an actuator, which corresponds to the positioning apparatus according to the present invention, not only supports the slider 210 but also positions the slider 210 with respect to the hard disk 262. The slider 210 is moved in the track crossing direction of the hard disk 262 by means of the actuator to be positioned with respect to the hard disk 262. The magnetic head 291 of the slider 210 records information on the hard disk 262 by means of a writing element and reproduces information recorded in the hard disk 262 by means of a reading head.

A description of the preferred embodiment according to the present invention was given above in detail. However, it should be appreciated that a wide variety of alterations and modifications are possible as far as they do not depart from the spirit and scope of the attached claims.

What is claimed is:

1. A method of manufacturing a perpendicular magnetic head having a writing element that writes magnetic information to a recording medium, comprising:

a first step for forming a main magnetic pole part generating a magnetic field on a substrate;

a second step for removing at least a part of the substrate and a material existing at a circumference of the main magnetic pole part so as to expose an entire circumference of the main magnetic pole part at a surface that becomes an opposing medium surface (ABS) opposite to the recording medium;

a third step for forming a shield gap film that is made of a nonmagnetic material so as to cover the entire circumference of the main magnetic pole part at least at the surface that becomes the ABS; and a fourth step for forming a shield layer so as to cover an entire circumference of the shield gap film at least at the surface that becomes the ABS.

2. The method of manufacturing a perpendicular magnetic head according to claim 1, wherein in the first step, the main magnetic pole part is formed on a nonmagnetic film after the nonmagnetic film is formed on the substrate so as to adjust a shape of the main magnetic pole part, and in the second step, at least a part of the substrate and a part of the nonmagnetic film are removed so as to expose the entire circumference of the main magnetic pole part at the surface that becomes the ABS.

3. The method of manufacturing a perpendicular magnetic head according to claim 2, wherein in the first step, a resist having an opening part with a certain shape is formed on the substrate, the nonmagnetic film is formed on the exposed surface of the substrate at the opening part and on side walls of the resist forming the opening part, and the resist is removed after the main magnetic pole part is formed on the nonmagnetic film.

4. The method of manufacturing a perpendicular magnetic head according to claim 2, wherein in the first step,
 a hole part with a certain shape is formed in the substrate,
 the nonmagnetic film is formed at a surface of the hole part so as to adjust the shape of the main magnetic pole part, and
 the main magnetic pole part is formed on the nonmagnetic film located at the surface of the hole part.

5. The method of manufacturing a perpendicular magnetic head according to claim 1, wherein in the third step, the shield gap film covers the entire circumference of the main magnetic pole part with a substantially uniform thickness at the surface that becomes the ABS.

6. The method of manufacturing a perpendicular magnetic head according to claim 1, further comprising a step for polishing the surface that becomes the ABS after the third step.

* * * * *